United States Patent
Kobayashi et al.

(10) Patent No.: US 10,697,638 B2
(45) Date of Patent: Jun. 30, 2020

(54) FUEL INJECTION DEVICE

(71) Applicants: KAWASAKI JUKOGYO KABUSHIKI KAISHA, Kobe-shi, Hyogo (JP); JAPAN AEROSPACE EXPLORATION AGENCY, Tokyo (JP)

(72) Inventors: Masayoshi Kobayashi, Kobe (JP); Ryusuke Matsuyama, Osaka (JP); Kenta Yamaguchi, Kakogawa (JP); Hideki Ogata, Kakogawa (JP); Takeo Nishiura, Kobe (JP); Hitoshi Fujiwara, Tokyo (JP)

(73) Assignees: KAWASAKI JUKOGYO KABUSHIKI KAISHA, Hyogo, Kobe-shi (JP); JAPAN AEROSPACE EXPLORATION AGENCY, Chofu-shi, Tokyo (JP)

( * ) Notice: Subject to any disclaimer, the term of this patent is extended or adjusted under 35 U.S.C. 154(b) by 574 days.

(21) Appl. No.: 15/435,388

(22) Filed: Feb. 17, 2017

(65) Prior Publication Data

US 2017/0159939 A1 Jun. 8, 2017

Related U.S. Application Data

(63) Continuation of application No. PCT/JP2015/073023, filed on Aug. 17, 2015.

(30) Foreign Application Priority Data

Aug. 18, 2014 (JP) .................. 2014-166125

(51) Int. Cl.
*F23R 3/00* (2006.01)
*F23R 3/34* (2006.01)
(Continued)

(52) U.S. Cl.
CPC .................. *F23R 3/34* (2013.01); *F02C 7/22* (2013.01); *F02C 7/232* (2013.01); *F23R 3/002* (2013.01);
(Continued)

(58) Field of Classification Search
CPC .. F23R 3/002; F23R 3/28; F23R 3/283; F23R 3/34; F02C 7/22; F05D 2260/30
See application file for complete search history.

(56) References Cited

U.S. PATENT DOCUMENTS 5,579,645 A 12/1996 Prociw et al.
7,415,828 B2 8/2008 Brown
(Continued)

FOREIGN PATENT DOCUMENTS

JP 09-500439 A 1/1997
JP 2004-144440 A 5/2004
(Continued)

OTHER PUBLICATIONS

International Preliminary Report on Patentability and Translation of Written Opinion dated Mar. 2, 2017, from the International Bureau in counterpart International application No. PCT/JP2015/073023.
(Continued)

*Primary Examiner* — Arun Goyal
(74) *Attorney, Agent, or Firm* — Sughrue Mion, PLLC

(57) ABSTRACT

A fuel injection device includes: a pilot fuel injector disposed at a radially center position; a main fuel injector having an annular shape and disposed so as to encircle the pilot fuel injector; a fuel injection portion that injects a fuel into a combustion chamber; a fuel supply unit that supplies a fuel to the fuel injection portion; a fuel introduction portion secured to a combustor housing that has the combustion chamber therein and introduces a fuel into the fuel supply unit; and an injector housing that is supported by the fuel
(Continued)

introduction portion and covers front portions of the pilot fuel injector and the main fuel injector. The fuel supply unit has a base supported by the fuel introduction portion, and an annular body supported by the injector housing via a support pin so as to be radially movable relative to the injector housing.

5 Claims, 4 Drawing Sheets

(51) Int. Cl.
    *F02C 7/232*     (2006.01)
    *F23R 3/28*     (2006.01)
    *F02C 7/22*     (2006.01)

(52) U.S. Cl.
    CPC ............ *F23R 3/28* (2013.01); *F05D 2220/32* (2013.01); *F05D 2240/35* (2013.01); *F05D 2260/30* (2013.01)

(56) References Cited

U.S. PATENT DOCUMENTS

| | | | |
|---|---|---|---|
| 8,783,038 B2 | 7/2014 | Horikawa et al. | |
| 8,806,871 B2 | 8/2014 | McMasters et al. | |
| 8,935,911 B2* | 1/2015 | Nonaka | F23D 11/386 60/39.094 |
| 9,429,324 B2 | 8/2016 | Matsuyama et al. | |
| 9,664,392 B2* | 5/2017 | Bellino | F23R 3/283 |
| 2004/0237530 A1 | 12/2004 | Brown | |
| 2009/0255120 A1 | 10/2009 | McMasters et al. | |
| 2009/0255262 A1 | 10/2009 | McMasters et al. | |
| 2012/0304649 A1 | 12/2012 | Matsuyama et al. | |
| 2013/0036739 A1 | 2/2013 | Horikawa et al. | |

FOREIGN PATENT DOCUMENTS

| | | |
|---|---|---|
| JP | 2011-528074 A | 11/2011 |
| JP | 2012-251741 A | 12/2012 |
| JP | 2013-178035 A | 9/2013 |
| WO | 94/28351 A1 | 12/1994 |
| WO | 2011/092779 A1 | 8/2011 |

OTHER PUBLICATIONS

International Search Report of PCT/JP2015/073023 dated Nov. 2, 2015 [PCT/ISA/210].

* cited by examiner

FUEL INJECTION DEVICE

CROSS REFERENCE TO THE RELATED APPLICATION

This application is a continuation application, under 35 U.S.C. § 111(a), of international application No. PCT/JP2015/073023, filed Aug. 17, 2015, which claims priority to Japanese patent application No. 2014-166125, filed Aug. 18, 2014, the disclosure of which are incorporated by reference in their entirety into this application.

BACKGROUND OF THE INVENTION

Field of the Invention

The present invention relates to a fuel injection device for use in, for example, a combustor of a gas turbine engine and, more particularly, to the fuel injection device equipped with a complex fuel injection device comprised of a plurality of fuel injectors.

Description of Related Art

In recent years, in consideration of the environment, there is a need for a reduction of emissions such as NOx (nitrogen oxide) emitted from gas turbine engines. A fuel injection device of the conventional aircraft gas turbine combustor is of a diffusive combustion type, and since in the diffusion combustion, the burning reaction takes place based on the stoichiometric mixture ratio, the flame temperature tends to increase. Considering that the emission of NOx is known to exponentially increase with the increase of the flame temperature, lowering of the flame temperature appears to effectively suppress the emission of NOx. However, in the current situation of the propensity for high temperature and high pressure in the gas turbine engine, further suppression of the emission of NOx with the conventional diffusive combustion method is limited.

In order to lower the flame temperature, a fuel injection device of a lean combustion method is considered effective. The lean combustion method is known to be a method of burning an air-fuel mixture in which the ratio of fuel relative to air is lowered, and the lean combustion according to this method contributes to a considerable reduction of the flame temperature as compared with that afforded by the conventional diffusive combustion method. On the other hand, however, the lean combustion method tends to result in an instable and incomplete combustion because of the relatively low flame temperature. In view of this, a concentric-type fuel injection device in which a pilot fuel injector is disposed on an inner side and a main fuel injector is disposed on an outer side so as to be concentric with the pilot fuel injector is used (see, for example, Patent Document 1). This concentric-type fuel injection device realizes a low NOx emission by mainly causing the main fuel injector to perform lean combustion while causing the pilot fuel injector to maintain stable combustion by a diffusion combustion method during a high power operation, and by causing the pilot fuel injector to stabilize a flame by diffusion combustion during a low power operation.

RELATED DOCUMENT

Patent Document

[Patent Document 1] JP Laid-open Patent Publication No. 2012-251741

SUMMARY OF THE INVENTION

However, in the concentric-type fuel injection device, both of the main fuel injector and the pilot fuel injector are put into operation during the high power operation, but only the pilot fuel injector is put into operation and the main fuel injector is not used during the low power operation. For this reason, coking of fuel remaining in a fuel pipe of the main fuel injector sometimes occurs due to heat of high-temperature air flowing around the fuel injector during the low power operation in which no fuel flows in the main fuel injector. In order to prevent such coking in the fuel pipe, it is effective to cover the main fuel injector with a heat-shielding housing. In this case, however, there is a possibility of occurrence of stress resulting from a thermal expansion difference between the main fuel injector, which has a relatively low temperature, and the heat-shielding housing, which is exposed to a high temperature.

An object of the present invention is to provide a highly reliable fuel injection device in which a fuel injector can be supported with certainty while effectively preventing coking in a main fuel injector in order to solve the above problems.

In order to attain the above object, a fuel injection device according to the present invention is a fuel injection device for a combustor of a gas turbine, including: a pilot fuel injector disposed at a radially center position; a main fuel injector having an annular shape and disposed so as to encircle an outer periphery of the pilot fuel injector; a fuel injection portion configured to inject a fuel into a combustion chamber; a fuel supply unit configured to supply a fuel to the fuel injection portion; a fuel introduction portion secured to a combustor housing that has the combustion chamber therein and configured to introduce a fuel into the fuel supply unit; and an injector housing that is supported by the fuel introduction portion and covers front portions of the pilot fuel injector and the main fuel injector. The fuel supply unit has a base supported by the fuel introduction portion, and the fuel supply unit has an annular main body supported by the injector housing via a support pin so as to be radially movable relative to the injector housing.

According to this configuration, the fuel supply unit, which is maintained at a relatively low temperature, is supported by the injector housing, which is exposed to a high-temperature air, so as to be movable relative to the injector housing in a radial direction. This relative movement in the radial direction absorbs a thermal expansion difference between the injector housing and the fuel supply unit. In the concentric-type fuel injection device, it is therefore possible to support fuel injector with certainty while effectively preventing coking in the main fuel injector due to a heat-shielding effect of the injector housing. Furthermore, the structure can be made simple because pin coupling using the support pins is employed.

In one embodiment of the present invention, a plurality of the support pins may be radially inserted into an outer periphery of the main body of the fuel supply unit such that the support pins are fixed to the outer periphery of the main body of the fuel supply unit, and the support pins may be inserted through a plurality of through-holes that are formed in the injector housing so as to be opened radially and to be arranged in a circumferential direction, so that the main body of the fuel supply unit is supported by the injector housing. According to this configuration, a thermal expansion difference between the injector housing and the fuel supply unit can be absorbed with a simple support structure.

In one embodiment of the present invention, the main body of the fuel supply unit may be provided with a plurality of arms, each arm extending circumferentially and having a distal end portion with the support pin radially inserted thereinto such that the support pin is fixed to the distal end portion, and the support pins may be joined to the injector housing so that the main body of the fuel supply unit is supported by the injector housing. According to this configuration, a thermal expansion difference between the injector housing and the fuel supply unit can be absorbed with a simple structure using the support pins. Furthermore, since the support pins can be fixed to both of the injector housing and the fuel supply unit, it is possible to prevent occurrence of fretting resulting from relative movement between the support pins and the injector housing or between the support pins and the fuel supply unit. This further increases reliability of the fuel injection device.

In one embodiment of the present invention, the support pins may be screwed radially into respective screw holes formed in the fuel supply unit. According to this configuration, the support pins can be fixed to the fuel supply unit with certainty with a simple structure.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
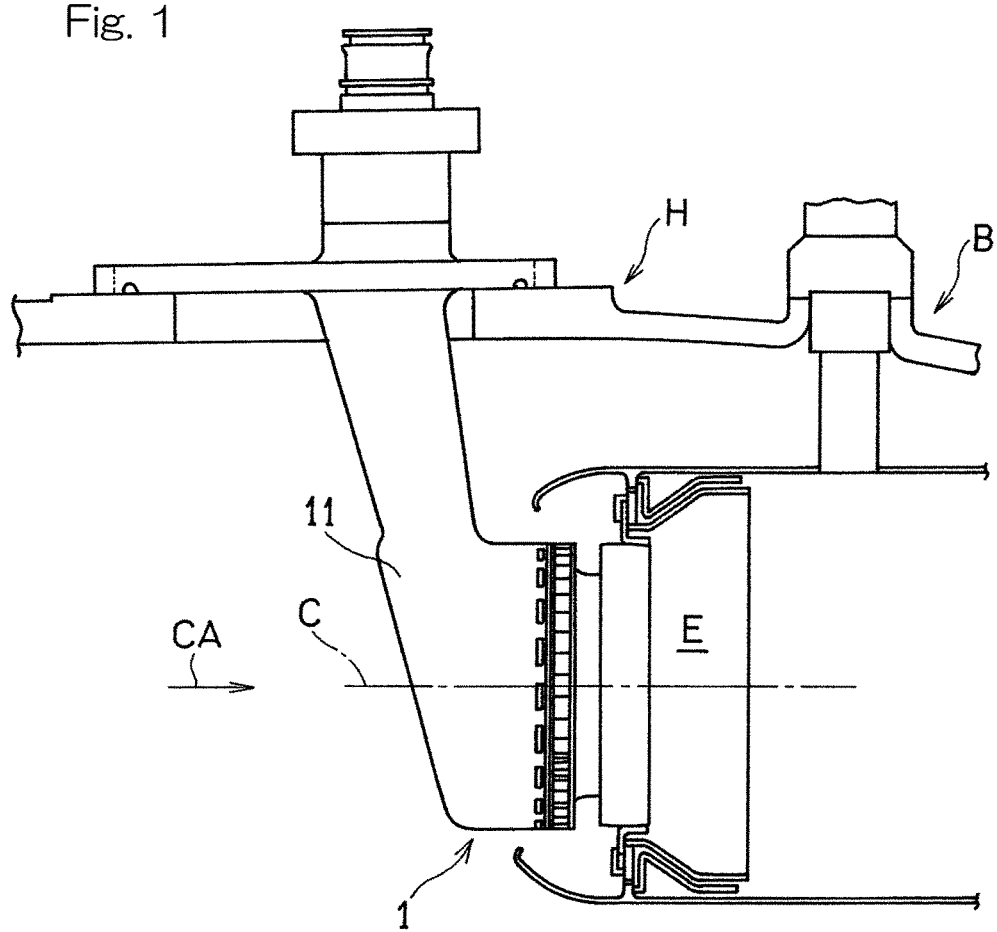
FIG. 1 is a cross-sectional view schematically showing a combustor including a fuel injection device according to a first embodiment of the present invention.

Embodiments of the present invention will be described below with reference to the drawings. FIG. 1 illustrates a combustor B including a fuel injection device 1 according to a first embodiment of the present invention. The fuel injection device 1 is used in a combustor of a gas turbine engine to mix a fuel with a compressed air CA supplied from a compressor of the gas turbine engine so that the mixture is combusted in a combustion chamber E of the combustor B and to supply high-temperature and high-pressure combustion gas generated by the combustion to a turbine so that the turbine is driven. The combustor B according to the present embodiment is a so-called annular type combustor, and a plurality of fuel injection devices 1 are disposed on an annular top portion of the combustor B at regular intervals so as to be concentric with an engine rotation axis (not shown). Hereinafter, the combustion chamber E side in a direction of an axis C of the fuel injection device 1 is referred to as a rear side, and a side opposite to the rear side is referred to as a front side. The expressions "rear" and "front" added to names of constituent elements in the embodiments are used in the same meaning.

Figure 2:
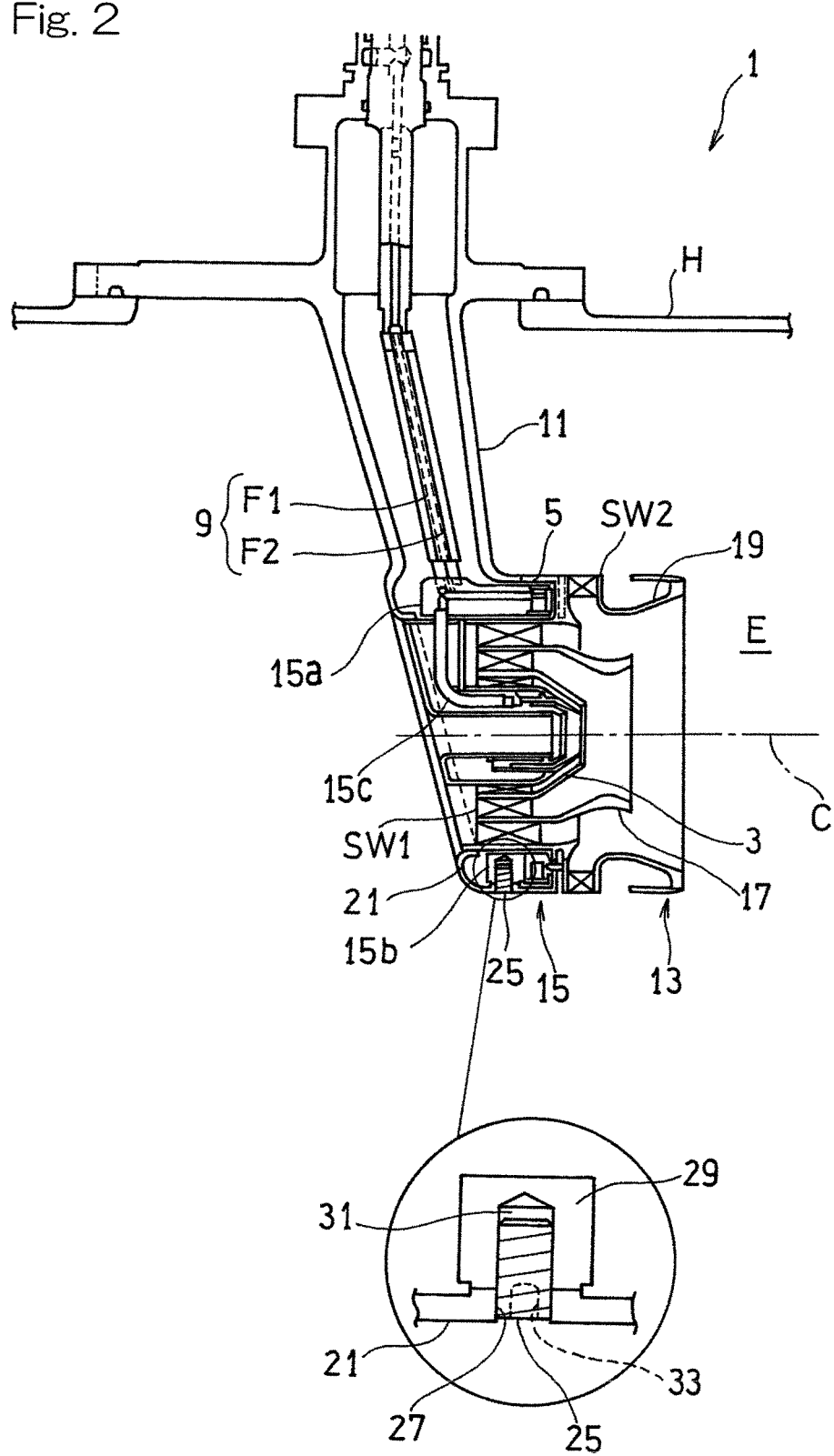
FIG. 2 is a cross-sectional view showing the fuel injection device according to the first embodiment of the present invention.

As shown in FIG. 2, the fuel injection device 1 is of a concentric-type fuel injection device, which includes a pilot fuel injector 3 disposed on the axis C of the fuel injection device 1 and a main fuel injector 5 provided so as to encircle an outer periphery of the pilot fuel injector 3 and be concentric with the axis C of the pilot fuel injector 3. A fuel for diffusion combustion injected from the pilot fuel injector 3 is mixed with an air delivered through a pilot swirler SW1 and is then supplied to the combustion chamber E of the combustor. Meanwhile, a fuel for lean combustion injected from the main fuel injector 5 is mixed with an air introduced from a main swirler SW2 and is then supplied as a lean mixture gas to the combustion chamber E.

Each fuel injection device 1 is supported by a housing H of the combustor at a stem portion 11 that forms a fuel introduction portion 9. The fuel introduction portion 9 includes a first fuel introducing system F1 for introducing fuel for diffusion combustion to be supplied to the pilot fuel injector 3 and a second fuel introducing system F2 for introducing fuel for lean premix combustion to be supplied to the main fuel injector 5.

Figure 3:
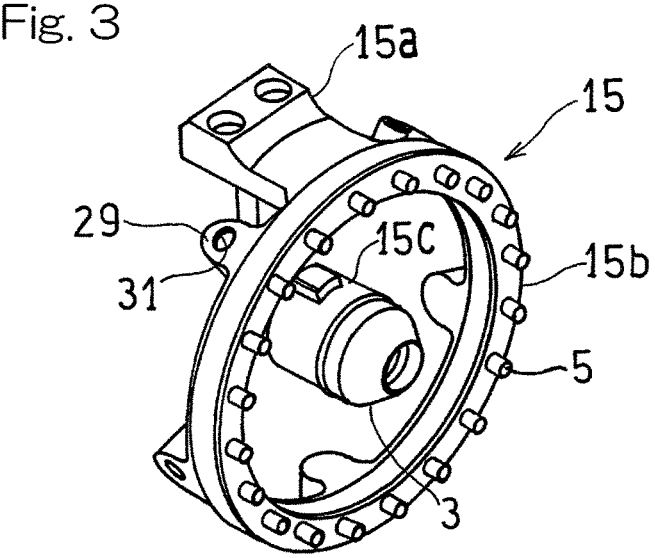
FIG. 3 is an exploded perspective view showing a portion of the fuel injection device shown in FIG. 2.

The fuel injection device 1 includes a fuel injection portion 13 that injects a fuel into the combustion chamber E and a fuel supply unit 15 that supplies a fuel to the fuel injection portion 13. The fuel supply unit 15 includes a base 15a that is coupled with the fuel introduction portion 9, a main body 15b shown in FIG. 3 that supplies a fuel for the pilot fuel injector 3 and supplies a fuel for the main fuel injector 5, and a pilot fuel supply section 15c that is provided at a radially center position and supplies the fuel from the main body 15b to the pilot fuel injector 3. The main body 15b has an annular shape and includes therein an annular fuel supply passage.

As shown in FIG. 2, the fuel injection portion 13 includes a pilot nozzle 17 that ejects a fuel from the pilot fuel injector 3 into the combustion chamber E, and a main nozzle 19 that is provided on a radially outer side of the pilot nozzle 17 and mixes fuel from the main fuel injector 5 with an air and ejects the mixture into the combustion chamber E. Each of the pilot nozzle 17 and the main nozzle 19 is shaped such that a diameter thereof gradually increases toward the combustion chamber E.

A front portion of the fuel injection device 1, more specifically, a front portion of the annular main body 15b of the fuel supply unit 15 is covered with an injector housing 21 of a substantially annular shape. The injector housing 21 is supported by the fuel introduction portion 9. The injector housing 21 shields the fuel supply unit 15 from heat of a high-temperature air flowing around the fuel supply unit 15.

The base 15a of the fuel supply unit 15 is supported by the fuel introduction portion 9. The annular main body 15b of the fuel supply unit 15 is supported by the injector housing 21 so as to be movable in a radial direction relative to the injector housing 21. These support structures will be described in detail below. In the following description, the term "radial direction" refers to a radial direction of the injector housing 21 (and of members that are concentric with the injector housing 21) unless otherwise specified.

Figure 4:
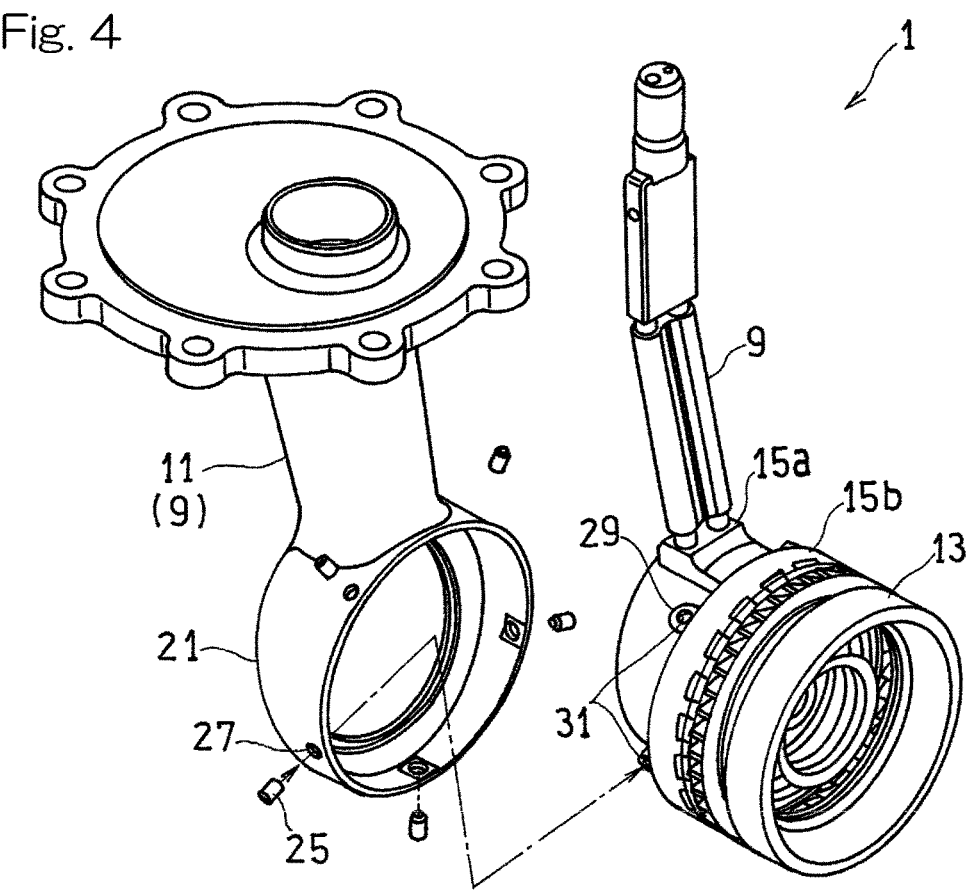
FIG. 4 is a perspective view showing a fuel supply unit used in the fuel injection device shown in FIG. 2.

As shown in FIG. 4, the injector housing 21 includes a peripheral wall formed with a plurality of through-holes 27 in the form of round holes opened in the radial direction and arranged in a circumferential direction. By inserting a plurality of support pins 25 through respective through-holes 27 and then inserting the support pins 25 into the main body 15b of the fuel supply unit 15 in the radial direction so that the support pins 25 are fixed to the main body 15b, the main body 15b of the fuel supply unit 15 is supported by the injector housing 21 via the support pins 25. In other words, in the present embodiment, the plurality of the support pins 25 are inserted into the outer periphery of the main body 15b of the fuel supply unit 15 in the radial direction so that the support pins 25 are fixed to the outer periphery of the main body 15b, and the support pins 25 are inserted through the radially-opened through-holes 27 that are arranged in the injector housing 21 in the circumferential direction. Thus, the main body 15b of the fuel supply unit 15 is supported by the injector housing 21.

The main body 15b of the fuel supply unit 15 has a plurality of support projection pieces 29 that protrude towards the front side and are provided at regular intervals in the circumferential direction. Each of the support projection pieces 29 has a screw hole 31 that is opened in the radial direction. The support pins 25 are screwed into respective screw holes 31 in the support projection pieces 29 of the fuel supply unit 15 in the radial direction and are thus fixed to the fuel supply unit 15 so as not to be movable relative to the fuel supply unit 15. As shown in the partially enlarged view encircled by the circle in FIG. 2, each of the support pins 25 is in the form of a cylindrical pin having a threaded outer periphery. A slight gap exists in a radial direction of the through-holes 27 between each of the support pins 25 and the peripheral wall of each of the through-holes 27 of the injector housing 21. Each of the support pins 25 has, at a top portion thereof, a rectangular bore 33, into which a tool is to be inserted. By employing such a support structure, sliding movement in the radial direction is allowed between the through-holes 27 of the injector housing 21 and the support pins 25.

According to the fuel injection device 1 of the present embodiment, the fuel supply unit 15, which is maintained at a relatively low temperature due to the fuel flowing therein, is supported by the injector housing 21 so as to be movable relative to the injector housing 21, which is exposed to a high-temperature air. This relative movement in the radial direction absorbs a thermal expansion difference between the injector housing 21 and the fuel supply unit 15. In this way, it is possible to support the fuel injector with certainty while effectively preventing coking of fuel in the main fuel injector 5 due to the heat-shielding effect of the injector housing 21 in the concentric-type fuel injection device 1. In particular, it is possible to absorb a thermal expansion difference between the injector housing 21 and the fuel supply unit 15 by employing a simple support structure using the support pins 25.

Figure 5:
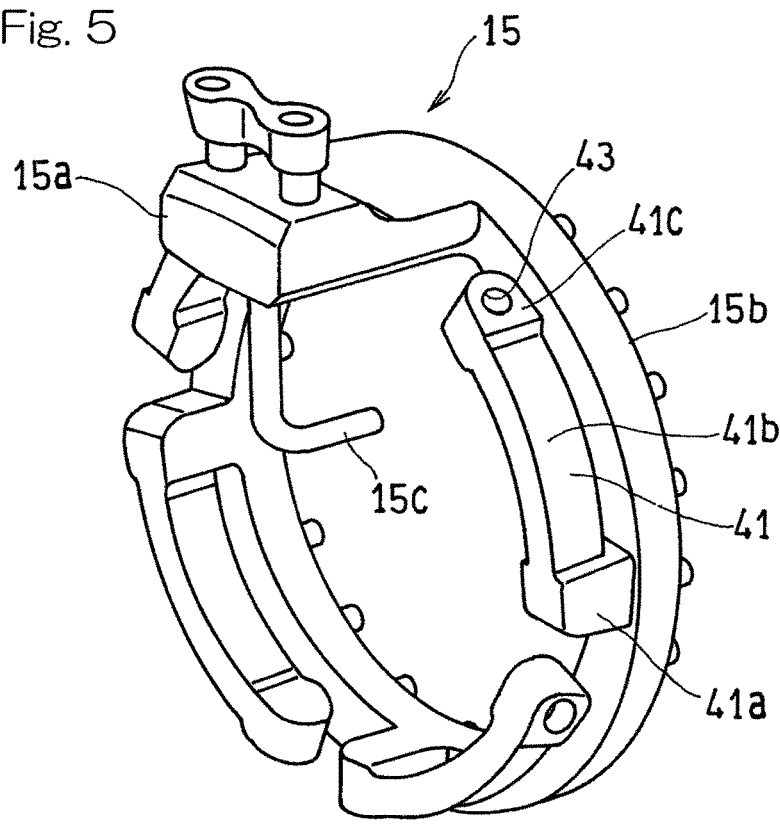
FIG. 5 is a perspective view showing a fuel supply unit used in a fuel injection device according to a second embodiment of the present invention.

Next, a second embodiment of the present invention shown in FIG. 5 will be described. The fuel injection device 1 according to the second embodiment is the same as that of the first embodiment in that the annular main body 15b of the fuel supply unit 15 is supported by the injector housing 21 so as to be movable relative to the injector housing 21 in a radial direction, but is different from that of the first embodiment in terms of a specific support structure. In the following description, aspects of the second embodiment that are different from the first embodiment are mainly described, and description of aspects that are the same as the first embodiment is omitted.

In the present embodiment, the main body 15b of the fuel supply unit 15 is provided with a plurality of arms 41 each extending in a circumferential direction. Each arm 41 has a distal end portion with the support pin 25 is inserted thereinto such that the support pin is fixed to the distal end portion. The support pins 25 are joined to the injector housing 21, so that the main body 15b of the fuel supply unit 15 is supported by the injector housing 21.

Figure 6:
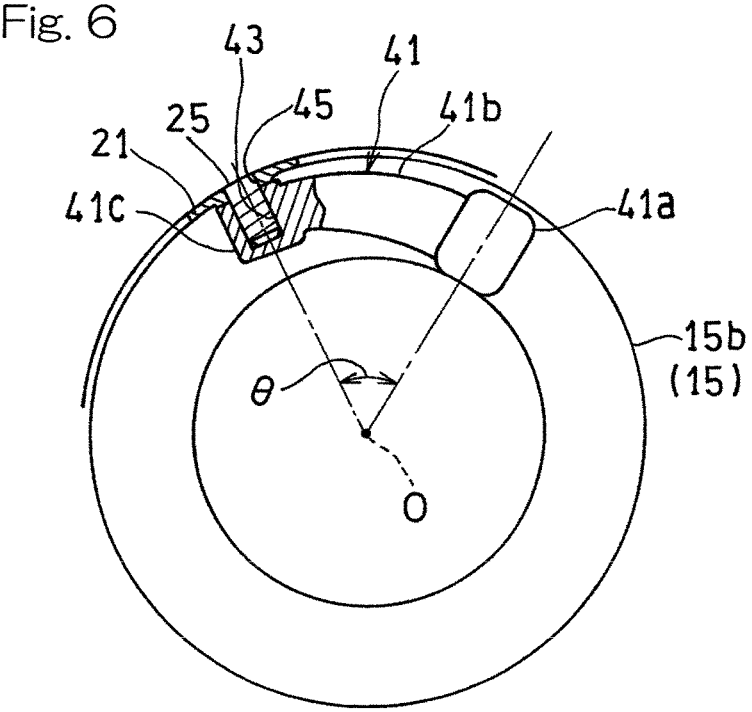
FIG. 6 is a schematic view for explaining a specific form of an arm of the combustion device shown in FIG. 5.

Specifically, each of the arms 41 includes an arm proximal end portion 41a that protrudes towards the front side from the main body 15b of the fuel supply unit 15, an arm body 41b extending from the arm proximal end portion 41a along the circumferential direction of the main body 15b, and an arm distal end portion 41c provided at a distal end of the arm body 41b. Each arm distal end portion 41c has a screw hole 43 opened in the radial direction. The main body 15b of the fuel supply unit 15 is supported by the injector housing 21 by inserting the support pins 25 into respective distal end parts 41c of the arms 41 in the radial direction (by screwing the support pins 25 into respective screw holes 43 in this example) as shown in FIG. 6 and then inserting the support pins 25 into pin holes 45 of the injector housing 21 to thereby join the support pins 25 to the injector housing 21. FIG. 6 shows a cross section of only a part around the arm distal end portion 41c. In the present embodiment, the support pins 25 are joined to the injector housing 21 by welding. By employing such a support structure, the fuel supply unit 15 and the injector housing 21 are made movable relative to each other in the radial direction due to deflection of the arms 41.

The length of each of the arms 41, i.e., an opened angle θ at a center O of the main body of the fuel supply unit 15 from a center of the arm proximal end portion 41a in the circumferential direction to a center of the screw hole 43 of the arm distal end portion 41c (see FIG. 6) may be set as appropriate, and may be specifically in a range from 72° to 120° to absorb a thermal expansion difference between the injector housing 21 and the fuel supply unit 15 with certainty. The number of arms 41 is not limited to 5 in the example shown in FIG. 5 and may be set as appropriate. FIG. 6 illustrates only a representative one of the plurality of arms 41.

According to the fuel injection device according to the present embodiment, the fuel supply unit 15 is supported by the injector housing 21 so as to be movable relative to the injector housing 21 in the radial direction due to deflection of the arms 41. This makes it possible to absorb a thermal expansion difference between the injector housing 21 and the fuel supply unit 15 as in the first embodiment. Furthermore, since the support pins 25 are coupled with both of the injector housing 21 and the fuel supply unit 15 so as not to be movable relative to the injector housing 21 and the fuel supply unit 15, occurrence of fretting between the support pins 25 and the injector housing 21 or between the support pins 25 and the fuel supply unit 15 is prevented. This further increases reliability of the fuel injection device 1. Furthermore, it is easy to set an optimum support structure according to the specification of the fuel injection device 1 by adjusting the number of arms 41 and the length of the arms 41. Furthermore, it is possible to prevent the fuel supply unit 15 from resonating with a frequency of combustion oscillation or other mechanical oscillation by changing the length of one or more of the arms 41 of the fuel supply unit 15.

Although the present invention has been fully described in connection with the embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . Fuel injection device
3 . . . Pilot fuel injector
5 . . . Main fuel injector
9 . . . Fuel introduction portion
13 . . . Fuel injection portion
15 . . . Fuel supply unit
15a . . . Base of Fuel supply unit
15b . . . Main body of Fuel supply unit
21 . . . Injector housing
25 . . . Support pin
41 . . . Arm
41c . . . Distal end portion of Fuel supply unit
E . . . Combustion chamber
H . . . Combustor housing

What is claimed is:

1. A fuel injection device for a combustor of a gas turbine, the fuel injection device comprising:
   a pilot fuel injector disposed at a radially center position;
   a main fuel injector having an annular shape and disposed so as to encircle an outer periphery of the pilot fuel injector;
   a fuel injection portion configured to inject a fuel into a combustion chamber;
   a fuel supply unit configured to supply the fuel to the fuel injection portion;
   a fuel introduction portion, comprising at least one fuel introducing system and a stem portion surrounding the at least one fuel introducing system, secured to a combustor housing that has the combustion chamber therein and configured to introduce the fuel into the fuel supply unit; and
   an injector housing that is annular and surrounds the pilot fuel injector and the main fuel injector, the injector housing supported by the fuel introduction portion and covers front portions of the pilot fuel injector and the main fuel injector, the front portions being on a side of the pilot fuel injector and the main fuel injector that faces away from the combustion chamber in an axial direction of the fuel injection device,
   wherein the fuel supply unit has a base supported by the fuel introduction portion, and
   the fuel supply unit has an annular main body including therein an annular fuel supply passage and supported by the injector housing via a support pin such that the annular main body is radially movable relative to the injector housing.

2. The fuel injection device as claimed in claim 1, wherein
   a plurality of support pins, including the support pin, are radially inserted into an outer periphery of the main body of the fuel supply unit such that the plurality of support pins are fixed to the outer periphery of the annular main body of the fuel supply unit, and
   the plurality of support pins are inserted through a plurality of through-holes that are formed in the injector housing so as to be opened radially and to be arranged in a circumferential direction, so that the annular main body of the fuel supply unit is supported by the injector housing.

3. The fuel injection device as claimed in claim 2, wherein the plurality of support pins are screwed radially into respective screw holes formed in the fuel supply unit.

4. The fuel injection device as claimed in claim 1, wherein
   the annular main body of the fuel supply unit is provided with a plurality of arms, each of the plurality of arms extending circumferentially and having a distal end portion with the support pin radially inserted thereinto such that the support pin is fixed to the distal end portion, and
   a plurality of support pins, including the support pin, are joined to the injector housing so that the annular main body of the fuel supply unit is supported by the injector housing.

5. The fuel injection device as claimed in claim 4, wherein the plurality of support pins are screwed radially into respective screw holes formed in the fuel supply unit.

* * * * *